United States Patent
Milburn

(10) Patent No.: US 8,652,282 B2
(45) Date of Patent: Feb. 18, 2014

(54) GLAZING UNIT WITH TRANSPARENT FILLER

(75) Inventor: Douglas I. Milburn, Sydney (CA)

(73) Assignee: Advanced Glazing Technologies, Ltd. (AGTL) (CA)

( * ) Notice: Subject to any disclaimer, the term of this patent is extended or adjusted under 35 U.S.C. 154(b) by 118 days.

(21) Appl. No.: 12/717,521

(22) Filed: Mar. 4, 2010

(65) Prior Publication Data

US 2010/0163157 A1 Jul. 1, 2010

Related U.S. Application Data

(62) Division of application No. 11/286,394, filed on Nov. 25, 2005, now Pat. No. 8,110,258.

(51) Int. Cl.
*B32B 37/24* (2006.01)

(52) U.S. Cl.
USPC .............................. 156/99; 158/107

(58) Field of Classification Search
USPC .............. 156/99, 102, 107, 109; 428/34, 116, 428/117, 118, 332; 52/786.1, 786.11, 52/786.13
See application file for complete search history.

(56) References Cited

U.S. PATENT DOCUMENTS

| 2,828,235 | A | 3/1958 | Holland et al. |
| 5,156,895 | A | 10/1992 | Martin |
| 6,699,558 | B1 * | 3/2004 | Milburn ......................... 428/73 |
| 2004/0096624 | A1 * | 5/2004 | Albright ....................... 428/116 |
| 2005/0048231 | A1 | 3/2005 | Morphet |

FOREIGN PATENT DOCUMENTS

| DE | 3612681 A1 | 7/1987 |
| WO | 0125581 A1 | 4/2001 |
| WO | 0235046 A2 | 5/2002 |

* cited by examiner

*Primary Examiner* — Christopher Schatz
(74) *Attorney, Agent, or Firm* — Laubscher & Laubscher, P.C.

(57) ABSTRACT

Disclosed is a method of making a glazing unit, comprising providing at least one self-supporting insert of light-transmissive insulation material in the form of honeycomb arrangement of cells, substantially filling the cells of said at least one self-supporting insert with a granular, thermally insulating, light transmissive filler material, and sandwiching said at least one insert between a pair of glass lites.

7 Claims, 2 Drawing Sheets

FIG. 1B  FIG. 1C

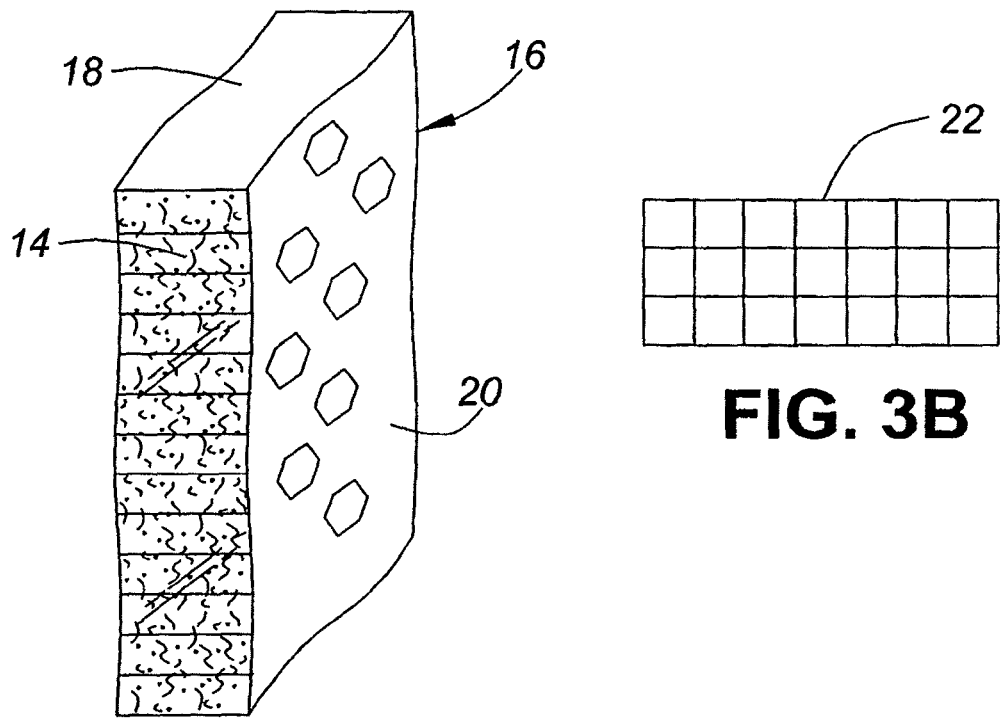
FIG. 3A
FIG. 3B
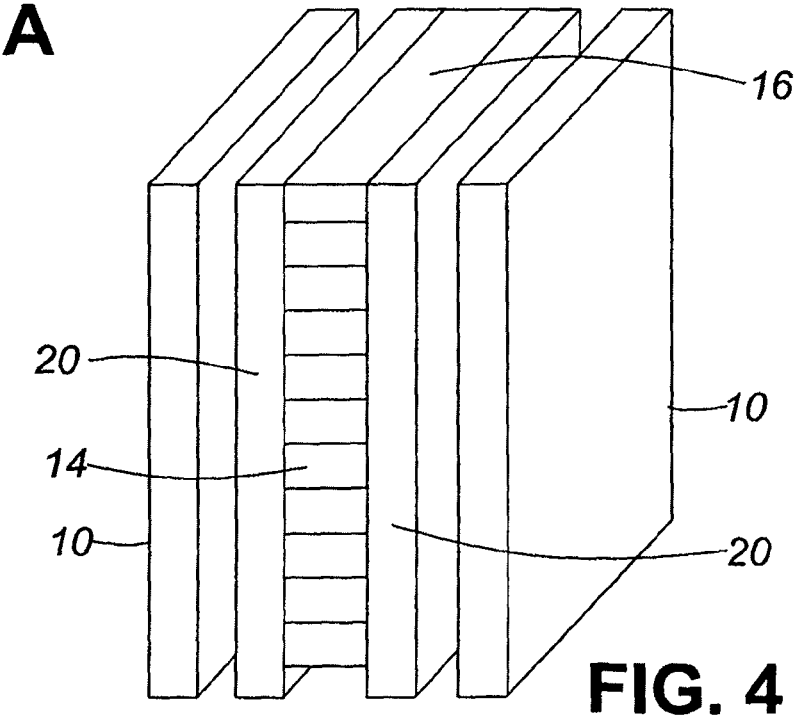
FIG. 4

GLAZING UNIT WITH TRANSPARENT FILLER

CROSS-REFERENCE TO RELATED APPLICATION

This application is a divisional application of U.S. application Ser. No. 11/286,394 filed Nov. 25, 2005.

FIELD OF THE INVENTION

This invention relates to the field of glazing, and in particular to insulated glazing units, typically of the type employed in large buildings, and to a method of making such glazing units.

BACKGROUND OF THE INVENTION

It has long been the practice in the building industry to employ double-glazed (or multiple-glazed) units as part of the wall of large buildings, such as office towers. While such units may be transparent, when they are used as windows, it is becoming increasingly popular to employ light diffusing units as part of the wall structure in order to increase the amount of natural light entering the building and thus decrease the artificial lighting requirements.

The glass industry uses sealed insulated glass units as a standard building block for windows and curtainwall. These are made up of two parallel glass panes, known in the industry as lites, which are separated by a spacer and sealed by a bead of sealant, typically silicone or hot-melt butyl rubber around the perimeter. These units are filled with air or inert gas which expands and contracts as the units are heated or cooled. The resultant pressure changes displace the lites of glass, and give the unit a concave or convex distortion. In normal operation temperature cycling and resultant distortion occurs on a daily basis.

Energy conservation in buildings is of prime importance. The thermal insulating properties of conventional glazing units are determined by the gap. Insulation value increases in proportion to gap because more air results in less conductive/convective heat transfer. Radiation, which typically accounts for slightly less than 50% of heat transfer, is not affected by a thicker gap, and therefore the proportionality constant is less than 1. The increase in insulation only occurs until the gap has a thickness of about ⅝", at which point convective movement of air increases heat transfer at a rate that cancels any increase in insulation.

One material that has a number of attractive properties for use in glazing applications is silica aerogel. One such silica aerogel is sold under the name Nanogel™ by Cabot Corporation. This is a sparse silica matrix with a very high percentage (95% or more) void fraction. It is typically made by creating a silica alcogel (silica gel with alcohol as the liquid rather than water) and then removing the alcohol. This must be done at supercritical conditions in order to avoid creating surface tension effects which would collapse the gel into a denser material (non-supercritical fluid removal would create the common dehydrated silica gel particles which are used as dessicants, rather than aerogel).

Silica aerogel is made of silica, it is as permanent and colorfast as glass itself. It is also one of the best insulating materials known (this is a function of the thermal infrared radiation absorption abilities of silica and the ultrafine (<50 nm scale) structure. Because silica does not absorb visible light, and the physical inhomogeneities of the gel structure are much less than a wavelength of light (50 nm vs 500 nm wavelength for green light), silica aerogel can be highly transparent. Being 95% void, silica aerogel has an index of refraction that is very close to air, so there is little surface reflection or refraction and therefore granular material can effectively transmit light without scattering.

Despite the promise, silica aerogel has a number of challenges. First, despite having been discovered a century ago, it is very difficult to make monolithic aerogel that is perfect enough to work as a component in a vision window, nor is it known how to make monolithic aerogel cost-effectively. As a result silica aerogel has been relegated to daylighting applications. Several manufacturers make plastic glazing products or rolled glass, where it is silica aerogel is used as an insulating fill.

It would be desirable to improve the insulating properties without a corresponding increase in gap size.

SUMMARY OF THE INVENTION

One way of improving the thermal insulating properties of a glazing unit, particularly if transparency was not critical, as in the case of light-diffusing units, would be to insert an insulating light transmissive filler material, such as silica aerogel, in the gap, particularly one having absorptive properties, so as to reduce the amount of radiation. It has however proved not feasible to do this because of the bulging effect noted above. If such a unit were simply filled with granular aerogel, convex distortion would create a greater volume in the centre and the material would settle, creating a permanent bulge in the middle and void at the top. The use of an adhesive to coat the particles and cement them together is undesirable because it would alter the index of refraction of the particles and greatly increase light scattering, thereby reducing light transmission.

According to the present invention there is provided a glazing unit comprising a pair of opposed glass lites defining a gap therebetween; at least one self-supporting insert of light-transmissive insulation material sandwiched in said gap between said glass lites and being in the form of honeycomb arrangement of cells; and a granular, thermally insulating, light-transmissive filler substantially filling said cells. The honeycomb permits the use of a larger dead air gap, for example 2.5", and also the honeycomb significantly reduces radiant heat transfer, resulting in a significantly increased R value.

The light-transmissive honeycomb is used to build a structure to retain the granular translucent insulation, eliminate the effects of glass movement, and reduce the effect of any actual settling. By subdividing the gap into small compartments, any actual settling will create insignificant gaps in numerous small cavities. Any reduction (which will be slight in any case) in insulation value is spread uniformly over the area. Had the gaps been consolidated, these effects would have created an unsightly gap at the top of the unit which would also be a thermal breach, possibly causing condensation.

It will be understood that additional lites and inserts could be added. For example, the unit could be a triple glazing unit with inserts present between each pair of lites. Also, there could be more than one layer of inserts between each pair of lites, or else the inserts could be formed in a tile structure.

The filler should normally be transmissive of visible light and absorptive of thermal radiation. A fine granular silica, such as silica aerogel is ideal for this purpose. The granules have a characteristic size which is in the sub-millimeter range, but the material has a microporous structure with a characteristic size in the order of 50 nm, i.e. less than the wavelength of light. The granules have a low index of refraction, which results in minimal scattering at the granule interfaces. The microporous structure, wherein the micropores have a size less than the wavelength of light, results in minimal scattering within the granules. Silica absorbs infrared radiation, thereby reducing the radiative component of heat transfer, and the intra-granular spaces are far too small to permit air convection. Other similar materials with infrared radiation absorptance and low thermal conductivity and diffuse light transmittance can be used.

Since the glazing unit is designed for use in diffuse light situations, the internal components need not be completely transparent. It is sufficient that they be light-transmissive, that is translucent or transparent. It does not matter if they transmit light diffusely.

A light transmissive veil or containment layer, for example, of non-woven fiber glass, should normally be inserted between the honeycomb and the glass lites and bonded to the honeycomb material to contain the filler, although in a less preferred embodiment it is possible to use the glass lites directly as the containment layer. The containment layer can also be plastic.

The honeycomb material should be sufficiently rigid to be self-supporting in combination with the filler and containment layers. It can be made of plastic. A suitable material is sold by Advance Glazings Ltd. under the name InsolCore™.

In another aspect the invention provides a method of making a glazing unit, comprising providing at least one self-supporting insert of light-transmissive insulation material in the form of honeycomb arrangement of cells; substantially filling the cells of said at least one self-supporting insert with a granular, thermally insulating, light transmissive filler material; and sandwiching said at least one insert between a pair of glass lites.

BRIEF DESCRIPTION OF THE DRAWINGS

The invention will now be described in more detail, by way of example only, with reference to the accompanying drawings, in which:

FIGS. 1A to C show the effects of temperature on a double glazing unit;

FIGS. 3A and B show a transparent honeycomb structure with translucent filler; and FIG. 4 is an exploded view of a glazing unit in accordance with one embodiment of the invention.

DETAILED DESCRIPTION OF THE PREFERRED EMBODIMENTS

Figure 1A:
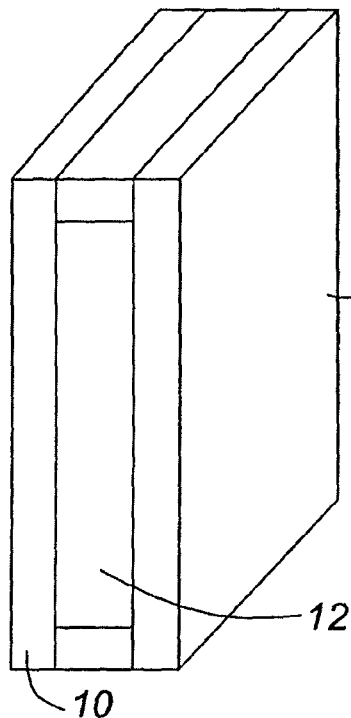

FIGS. 1A to 1C show the effects of temperature on a glazing unit having a pair of opposed glass lites 10 and an internal air gap 12. Upon heating the structure bulges in the middle (FIG. 1A) and upon cooling it becomes convex (FIG. 1C). The structure only has its parallel configuration (FIG. 1A) at its nominal operating temperature.

Figure 2A:
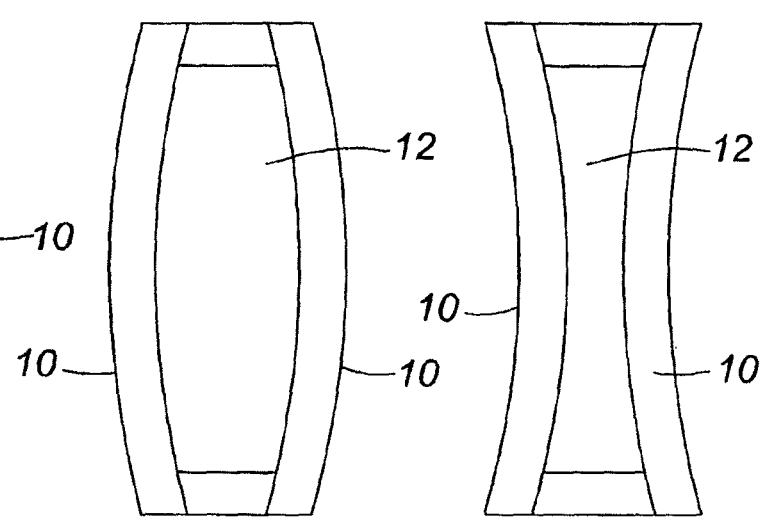
FIGS. 2A and B show the effect of settling of a granular material within a double glazing unit.
Figure 2A:
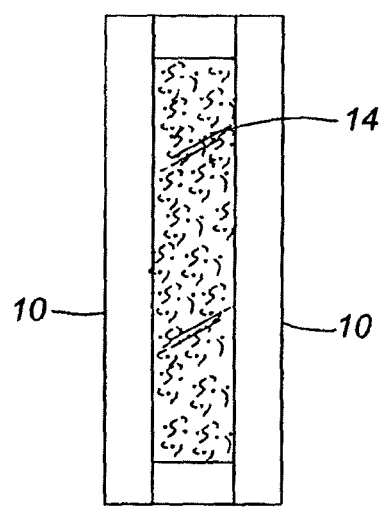
Figure 2B:
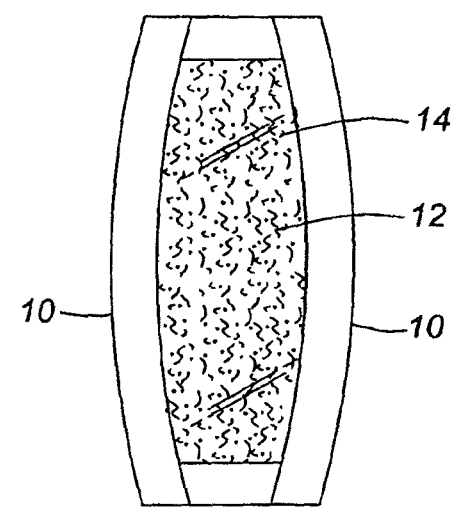

FIGS. 2A and 2b show what happens when the gap is filled with a filler material 14, such as silica aerogel. Initially, the glass lites 10 are parallel (FIG. 2A), but after a period of time the filler settles, and the lites bulge as shown in FIG. 2B.

FIG. 3A shows a transparent honeycomb structure 16 with a thickness approximately equal to the nominal gap between lites of the insulated glass unit, preferably about ½". This is a self-supporting honeycomb structure consisting of an array of cells 22 (see FIG. 3B) about 1 cm square extending completely through the structure. The honeycomb can be made of any suitable plastic material. As noted, a suitable material is InsolCore® by Advanced Glazings Ltd.

A single non-woven glass fiber or plastic containment layer 20 is then bonded to one side of the honeycomb structure 16. This may be made of any suitable transparent or translucent film or sheet, or a fabric with sufficiently fine mesh size to retain the granular transparent insulation, or combination thereof. The resulting structure is then placed on a flat surface with containment layer 20 down and open cells up. The cells are then filled completely with granular translucent insulation 14, such as silica aerogel, (for example, by overfilling and trowelling). Then a second light transmissive containment 20 layer, which also may, for example, be of non-woven fiber glass or plastic, is bonded to the top of the honeycomb structure. This creates a self supporting light diffusing translucent insert as shown in FIG. 3A.

The structure shown in FIG. 3A can then be inserted between a pair of glass lites, which can be sealed around their edges in a conventional manner, to form a complete insulated glazing unit, thereby diffusing light and reducing heat transfer. FIG. 4 shows the resulting product, where the non-woven fiber glass layers 20 also serve as containment layers.

In alternative embodiment, the filler can be retained directly in the honeycomb by the glass lites, which can be bonded directly to the honeycomb structure. Furthermore, one or more additional layers of material can be placed between the lites and the insert to improve light diffusion, control light transmittance, or alter the aesthetics of the final product. This can be a non-woven fibreglass veil, such as Advanced Glazings Ltd.'s AGL300. This layer may be simply sandwiched between the insert and the lite of glass and thereby held in place by friction, or preferably, bonded to the glass in order to obtain optimal stability and flatness and prevent wrinkling.

The insert 16 may be bonded to one or both lites of glass in order to prevent movement or creep over time, by use of a suitable adhesive.

EXAMPLE

A glazing unit was made using ½" thick IncolCore™ honeycomb insert, an AGL401 non-woven fibreglass veil as containment layers, cabot nanogel insulation, and clear ¼" glass forming the lites. An AGL 300 veil was bonded to the lites as described in our copending Canadian application no. 2,510, 947, with Edgetech IG's Triseal® Superspacer® and Tremco Proglaze II silicone.

A single insert of dimensions equal to the air gap may be used, or alternatively multiple smaller tiles may be used. Tiles or full-sized inserts may be the full thickness of the airgap or may only comprise part of the thickness of the gap, and other materials such as air or sparse white fibre can be used for the remainder. Such inserts may be used in fibre reinforced plastic panels such as kalwall www.kalwall.com, or in rolled channel glass, or between sheets of plastic.

In another embodiment honeycomb material is bonded directly to a lite of glass. This glass is dual purpose, acting as both containment layer and insulated glass unit lite. Bonding is via a suitable adhesive which should be non-yellowing and have sufficient long term adhesion to both glass and honeycomb, such as UV curing acrylic adhesives. A light diffusing layer may be incorporated as well.

Honeycomb is then filled with Granular translucent insulation. A second non-glass containment layer is bonded to honeycomb via adhesive or heat seal. A second lite of glass is cleaned, and a spacer attached to perimeter. Glass honeycomb structure filled with granular translucent insulation is used as second lite to fabricate insulated glass unit.

The resultant insulated glass unit can 'breathe' while the honeycomb structure retains the granular translucent insulation without movement or settling.

In yet another embodiment the liter serve directly as the containment layer. Structural adhesive is used to bond the glass to the honeycomb insert and prevent the granular material from distorting the glass. Spacing between glass is thereby maintained by honeycomb. This results in a glass-honeycomb-glass structural panel that has some desirable properties.

It has been found that glazing units in accordance with embodiments of the invention can achieve insulation values of R5 with a gap as small as ½" in comparison with a glazing unit employing an air or inert gas air filler, where the gap would need to be in the order of 2½" to achieve a similar result.

While ½" is a suitable thickness for the gap, since generally the for an air filled glazing unit the heat transfer is minimized, it will be appreciated that other gap sizes can be selected. With the filled glazing unit that blocks convection, it is possible to increase the thickness and simply add more and more fill to get an increased R-value in return. However, some practical limits are imposed, such as the cost of the fill, and framing compatibility (the glass industry is built around 1" thick units, such as ¼ glass, ½ gap, ¼" glass. They can handle thicker units, but it becomes less standard and therefore typically more expensive.

Another important issue is the ability to seal a unit. The variable pressure differential between the inside and outside is more of problem with thicker units, as the glass must move (convex or concave) by a % of the gap to relieve the pressure, and the absolute displacement is therefore bigger for thicker gaps. This creates more stress on the glass and seals. In practice, ½" gap works with conventional seals, but 1" gap (triples, for example with two ½" gaps) units are less reliable and it is not wise to seal units with greater than a 1" gap.

When the thickness is greater than 1", for instance in the case of 2.5" units with honeycomb insulation, venting is generally required. Venting works in translucent units but not in clear vision glass units. Venting is not standard practice, but does not create a significant technical problem.

The embodiments of the invention in which an exclusive property or privilege is claimed are defined as follows:

1. A method of making a sealed, insulated glass glazing unit, comprising the steps of:
creating a self-supporting light diffusing translucent insert, by:
providing a self-supporting light-transmissive insulation honeycomb arrangement of cells;
bonding a first light transmissive, porous containment layer to a first major side of the honeycomb arrangement of cells;
stabilizing the honeycomb arrangement of cells by completely filling the honeycomb arrangement of cells with granular transparent insulation;
bonding a second light transmissive, porous containment layer to a second major side of the filled honeycomb arrangement of cells to form the self-supporting light diffusing translucent insert;
wherein before the first and second containment layers are bonded to the honeycomb arrangement of cells, the method comprises the step of providing the first and second containment layers such that they have a pore size suitable to contain the granular insulation while permitting airflow through both the first and second containment layers and the granular insulation during use;
inserting the self-supporting light diffusing translucent insert between two glass lites; and
sealing the edges of the glass lites to form the sealed, insulated glass glazing unit.

2. The method as claimed in claim 1, wherein said granular insulation is absorptive of infrared radiation.

3. The method as claimed in claim 2, wherein said granular insulation has an internal microporous structure having a characteristic size less than the wavelength of light.

4. The method as claimed in claim 1, wherein said first and second containment layers are non-woven fiber glass.

5. The method as claimed in claim 3, wherein said microporous structure has a characteristic size in the order of about 50 nm.

6. The method as claimed in claim 5, wherein said granular insulation is silica.

7. The method as claimed in claim 1, wherein said granular light insulation is a silica aerogel.

* * * * *